(12) United States Patent
Rainisto

(10) Patent No.: US 10,136,310 B2
(45) Date of Patent: Nov. 20, 2018

(54) SECURE DATA TRANSMISSION

(71) Applicant: Microsoft Technology Licensing, LLC, Redmond, WA (US)

(72) Inventor: Roope Rainisto, Helsinki (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/695,939

(22) Filed: Apr. 24, 2015

(65) Prior Publication Data

US 2016/0316360 A1    Oct. 27, 2016

(51) Int. Cl.
| | |
|---|---|
| *H04L 29/06* | (2006.01) |
| *H04W 12/02* | (2009.01) |
| *H04L 9/08* | (2006.01) |
| *H04L 9/32* | (2006.01) |
| *G06F 21/60* | (2013.01) |
| *H04W 12/04* | (2009.01) |

(52) U.S. Cl.
CPC .......... *H04W 12/02* (2013.01); *G06F 21/602* (2013.01); *H04L 9/0866* (2013.01); *H04L 9/3231* (2013.01); *H04L 63/061* (2013.01); *H04L 63/0861* (2013.01); *H04W 12/04* (2013.01); *H04L 63/0442* (2013.01)

(58) Field of Classification Search
CPC . H04L 9/3247; H04L 63/0861; H04L 63/442; G06F 21/32
See application file for complete search history.

(56) References Cited

U.S. PATENT DOCUMENTS

| | | | |
|---|---|---|---|
| 5,784,463 A | * | 7/1998 | Chen ....................... G06F 21/33 380/282 |
| 6,035,398 A | | 3/2000 | Bjorn |
| 7,117,370 B2 | | 10/2006 | Khan et al. |
| 7,586,635 B2 | | 9/2009 | Maeda et al. |
| 8,086,857 B2 | | 12/2011 | Appenzeller et al. |
| 8,751,809 B2 | | 6/2014 | Dewan et al. |

(Continued)

FOREIGN PATENT DOCUMENTS

| | | |
|---|---|---|
| CN | 101984576 A | 3/2011 |
| JP | 2006108977 A | 4/2006 |

(Continued)

OTHER PUBLICATIONS

Moreno, et al., "Visualizing Key Authenticity: Turning Your Face into Your Public Key", In Proceedings of 6th China International Conference on Information Security and Cryptology, Oct. 20, 2010, 15 pages.

(Continued)

*Primary Examiner* — Dao Q Ho

(57) ABSTRACT

A wireless device and a method for secure data transmission is described. Information representing biometric data of a user is obtained. The information is processed to produce a code and the code is sent over a wireless technology. A response is requested of a device that has a matching code, where the matching can be within a predetermined tolerance. A response is received that includes at least one of a public key which includes the code as a part of the key and the identity of the device having the matching code. The data to be transmitted is encrypted with the public key and sent to the device with the matching code.

20 Claims, 5 Drawing Sheets

(56) References Cited

U.S. PATENT DOCUMENTS

2006/0288234 A1 12/2006 Azar et al.
2007/0140145 A1 6/2007 Kumar et al.
2014/0095867 A1 4/2014 Smith et al.
2014/0359290 A1 12/2014 Mccusker et al.

FOREIGN PATENT DOCUMENTS

| JP | 2007249349 A | 9/2007 |
| WO | 2004036802 A1 | 4/2004 |
| WO | 2006067739 A2 | 6/2006 |

OTHER PUBLICATIONS

Pape, et al., "Using Identity-Based Public-Key Cryptography with Images to Preserve Privacy", In Proceedings of the Third International Federation for Information Processing Digital Library, the Future of Identity in the Information Society, Aug. 4, 2007, 8 pages.

Klontz, et al., "Open Source Biometric Recognition", In Biometrics: Theory, Applications and Systems (BTAS), 2013 IEEE Sixth International Conference, Sep. 29, 2013, 8 pages. http://openbiometrics.org/publications/klontz2013open.pdf.

"International Search Report & Written Opinion Issued in PCT Application No. PCT/US2016/026077", Mailed Date: Jun. 17, 2016, 13 Pages.

"IEEE 802.11—Wikipedia, the Free Encyclopedia", Retrieved From <<https://en.wikipedia.org/wiki/IEEE_802.11>>, Jan. 1, 2015, 9 Pages.

Zeng et al., "A Face Hashing Algorithm using Mutual Information and Feature Fusion", In IEEE International Conference on Networking Sensing and Control, Apr. 15, 2007, pp. 386-391.

LIU et al., "A Biometric Identity Based Signature Scheme with Convenient Verification", In Proceedings of Future Generation Communication and Networking, vol. 1, Dec. 6, 2007, 4 pages.

"Second Written Opinion Issued in PCT Application No. PCT/US2016/026077", dated Jan. 4, 2017, 6 pages.

\* cited by examiner

SECURE DATA TRANSMISSION

BACKGROUND

Several technologies exist for peer-to-peer transmission of information. Such well-known technologies are for example Wi-Fi Direct, Bluetooth, Wi-Fi Aware, Awarenet, near-me area network (NAN). With a peer-to-peer connection two wireless devices can transfer data directly between each other. Often several such wireless devices are present in the same room and are within the communication range of each other. Using such peer-to-peer communication technologies there exists a need to send information from one device to another device in a secure manner and reliably to the correct device.

The embodiments described below are not limited to implementations which solve any or all of the disadvantages of known devices.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A method and a device are presented. In the method information representing biometric data of a user is obtained. The information is processed to produce a code and the code is sent over a wireless technology. A response is requested of a device that has a matching code, where the matching can be within a predetermined tolerance. A response is received that includes at least one of a public key that relates to an encryption method, which public key includes the code as a part of the key, and the identity of the device having the matching code. The data to be transmitted is encrypted with the public key and sent to the device with the matching code.

The device is a wireless device that comprises a biometric data capture module for obtaining information representing biometric data of a user, and a processor for processing the information to produce a code. The device comprises a wireless transmitter for sending the code over a wireless technology requesting response of a device that has a matching code where the matching can be within a predetermined tolerance. The device comprises a wireless receiver for receiving as a response at least one of a public key which includes the code as a part of the key and the identity of the device having the matching code. Further the device comprises a cryptoprocessor for encrypting data to be transmitted with the public key. The encrypted data is sent to the device with the matching code using the wireless transmitter.

Another method is presented where information representing biometric data of a user is obtained, and information is processed to produce a code. In the method at least one public key that relates to an encryption method is received over a wireless technology from at least one device whereby it is checked if any of the received at least one public key includes a code matching the produced code, where the matching can be within a predetermined tolerance. The data to be transmitted is encrypted with the public key having the matching code and sent to the device from which the public key including the matching code was received.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 1b illustrates an example view on the display of a wireless device of FIG. 1a;

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Although the present examples are described and illustrated herein as being implemented with handheld wireless devices, the devices described are provided as an example and not a limitation. As those skilled in the art will appreciate, the presented embodiments are suitable for application in a variety of devices comprising tablets, PDAs and laptops to name a few.

Figure 1A:
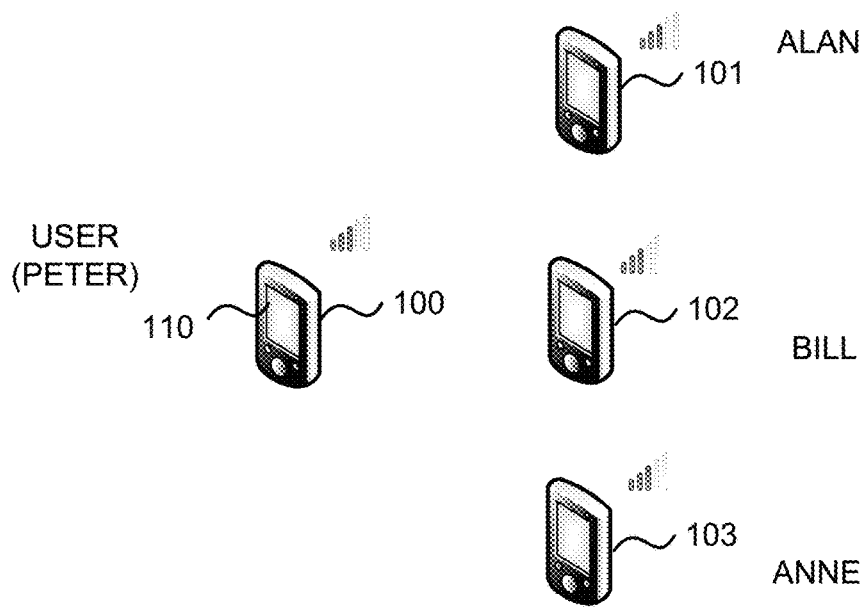
FIG. 1a illustrates an example of a situation of using a wireless device.

FIG. 1a illustrates an example of a situation of a user using a wireless device 100 in a room with other wireless devices 101, 102, 103 that in this example belong to other users. Herein is shown three other wireless devices 101-103 but there could be less or more other wireless devices. Mobile apparatuses and other wireless devices of today often have more than one wireless access technology. In FIG. 1a the wireless devices 100-102 have at least one peer-to-peer wireless communication interface and include at least one module with a peer-to-peer wireless communication technology to communicate over the one or more peer-to-peer wireless communication interfaces. Such peer-to-peer wireless communication technologies are for example Wi-Fi Direct, Bluetooth, Wi-Fi Aware, Awarenet, near-me area network (NAN). With a peer-to-peer wireless interface two wireless devices can transfer data directly between each other without the communication going via an access point, base station or other network element. When several such devices 100-103 equipped with peer-to-peer wireless communication are present in the same room they may be "visible" to each other, meaning the devices are within the communication range of each other. The wireless devices 100-103 need not be physically visible to each other or to the users of the devices 100-103. A device 100-103 can be within the communication range of another device even when it is e.g. inside a user's pocket, depending on the communication technology. Using radio, sonic and electromagnetic induction, there is no need for physical visibility whereas using optical communication normally needs physical visibility so that one device can receive a light beam transmitted by another device. However, as optical beams and rays reflect from some surfaces, physical visibility may not always be necessary even with optical communication.

Figure 1B:
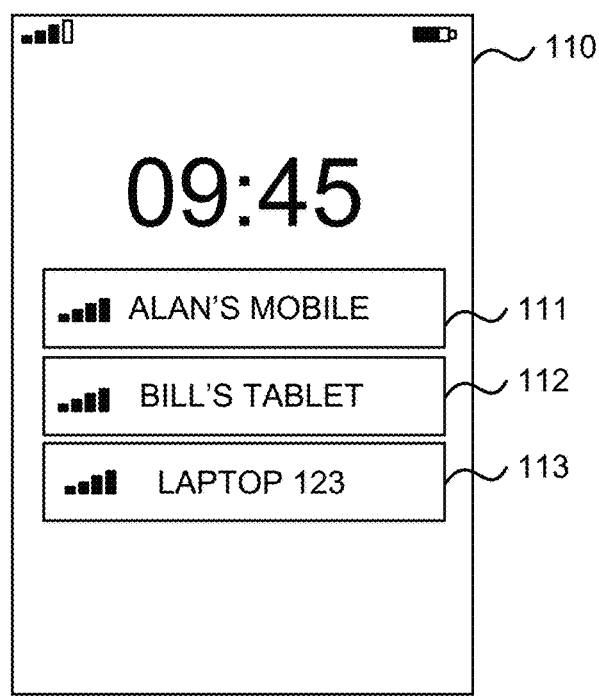

FIG. 1b illustrates an example view on the display 110 of wireless device 100. As is shown, device 100 can see the other wireless devices 101-103 that are within the range of the same wireless communication technology. Using the user interface of their device 100-103, users may be permitted to name their device, whereby the names 111-113 of wireless devices 101-103 are visible on the display 110 of wireless device 100. As is shown by references 111-112 the names (Alan's mobile, Bill's tablet) may include the user's name (here Alan and Bill). Alternatively the names may be more generic or not directly identifiable by username, as is illustrated by reference 113 where a user Anne has not indicated her name in the device name, but only the name "Laptop 123" is visible to others. Thus, when the user (whose name is let's say Peter) of wireless device 100 wants to send information/data to a particular user (Alan, Bill, or Anne), Peter wants to be sure of sending the information/data to the correct device 101-103. A practical example of such data would be a "friend request" sent locally by Peter from his device to one of Alan's, Bill's or Anne's devices, or a request to exchange business cards or other contact information. Using such peer-to-peer communication technologies, there exists a need to send information from one device 100 to another device 101-103 in a secure manner and reliably to the correct device (to the correct one of devices 101-103), especially when there are several other wireless devices 101-103 visible to the wireless device of the user, as is the case for Peter in FIG. 1a.

To achieve more reliability and security for such communication described above in connection with FIGS. 1a and 1b, herein is described a method referring to FIGS. 2, 3a, 3b and 3c. One part of the method is using an encryption method for encrypting the data that is to be transmitted. For example an encryption method using both a public key and a private key is used. There are many such known encryption methods, e.g. pretty good privacy (PGP), Paillier public key cryptosystem and RSA, and the method for achieving better reliability and security in peer-to-peer communication is not intended to be limited to using any particular encryption method. The public key in PGP normally comprises 1024 bytes and is typically randomly generated, e.g. by a random hash function. In PGP the private key is securely stored in the device, and the public key can be sent to other persons/devices. In many encryption methods it is possible to use keys (public key and private key) of different length according to the level of security desired. Thus in e.g. PGP, Paillier and RSA encryption methods the length of the keys can thus be the mentioned 1024 bytes, but can as well be 2048 bytes or 4096 bytes when a higher level of security is desired.

Figures 3A, 3B:
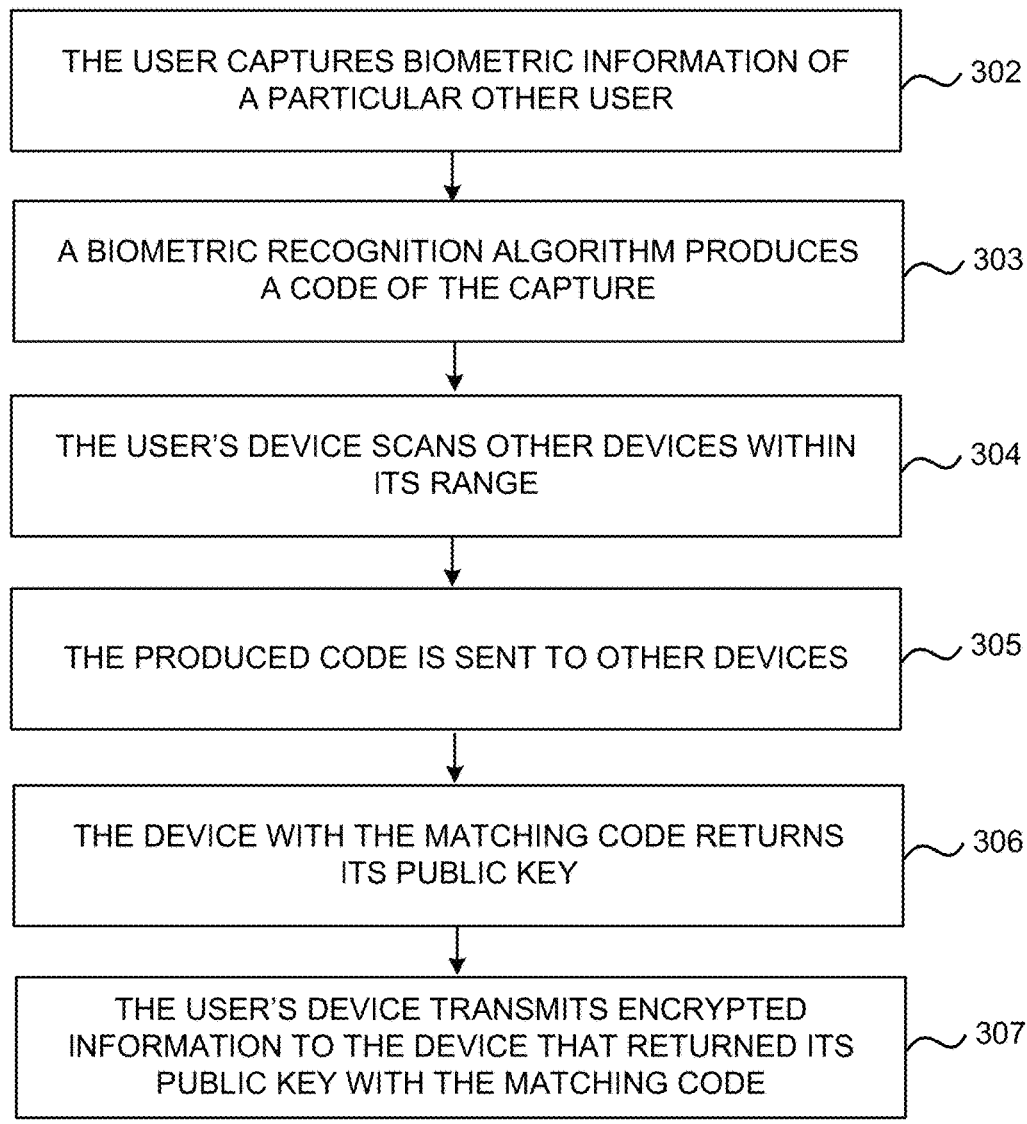
FIG. 3a is an example flow diagram of a method for training a device.
FIG. 3b is an example flow diagram of a method for transmitting data to the correct wireless device.

To add more reliability and security for peer-to-peer wireless communication, biometric recognition or biometric identification may be used in order to identify the wireless device of the person to which one wants to send data. Examples of biometric data are face, iris, fingertip, palm print, voice and DNA, and accordingly face recognition, iris recognition, fingertip recognition, palm print recognition, voice recognition, and DNA profiling may be used. The following method describes using face recognition as an example, but other biometric recognition or identification methods can be used as well. In the method, the wireless devices 100-103 are equipped with a biometric data capture module, e.g. a camera such as a digital camera capable of taking at least still images. Alternatively, a separate biometric data capture module could be used which can be coupled in a physical or a communication connection with the wireless device 100-103 in order to transfer the biometric data capture information to the wireless device 100-103. The data captured by the biometric capture module is processed by biometric recognition. Referring to FIG. 3a the user of a device 100-103 first teaches or trains (step 300) the device using the capture module and biometric recognition. For example, to train 300 the device, the user takes one or more pictures of his/her face using a camera in his/her wireless device. There are several known biometric recognition software and algorithms, e.g. face recognition algorithms that can be used for training the device and for performing the biometric recognition. An example of an open source based software is OpenBR, can be found in J. Klontz, B. Klare, S. Klum, A. Jain, M. Burge. "Open Source Biometric Recognition", *Proceedings of the IEEE Conference on Biometrics: Theory, Applications and Systems (BTAS)*, 2013. The method is not limited to the use of any particular biometric recognition method, software or algorithm. When using a face recognition algorithm, once the face recognition algorithm is trained 300 by the user taking pictures of his/her face, the algorithm produces a certain result at step 301. Typically the result is in the form of vectors that can be expressed as a certain number of bytes, i.e. a code expressed e.g. as characters. In the OpenBR software described in the above referred IEEE paper, the result can be expressed as 750 bytes. In other biometric recognition methods the results can have a different length.

Once the device is trained, a device with the same or corresponding biometric recognition algorithm or software should ideally produce the same result of the same object. For more secure and liable transmission of data to the correct device alternative methods are described with reference to FIGS. 3b and 3c. If a user takes a picture of a face (step 302 in FIGS. 3b and 3c), the face recognition result should match the earlier trained result within a certain tolerance. It is up to a designer of a biometric recognition method, such as OpenBR, to decide what level of matching accuracy is accepted to produce a matching result. For some methods the matching accuracy may be between 80% to 90% and in other methods above 90%. Alternatively, a hashing function could be used as a recognition method. For example a picture taken of a user (e.g., Alan) could be hashed by a hashing function to produce the code.

In the method presented herein, biometric recognition is combined with an encryption method utilizing a public key and a private key. The result of the biometric recognition is used as a portion of the public key of the encryption method. Combining the above mentioned OpenBR software where the result or produced code has a size of 750 bytes and the above mentioned PGP encryption method where the public key includes e.g. 1024 bytes, the result of the biometric recognition could be used as the first 750 bytes of the public key (or other portion of the key), and the rest 274 bytes can be generated randomly. With some biometric recognition software, a reliable enough result can be achieved with 128 or 256 bytes, and this result could be used to create a portion of the public key (e.g. the first bytes, the last bytes, or bytes somewhere in the middle of the public key) and the other bytes of the public key (which in case of PGP with a public key of 1024 bytes would mean the other 896 or 768 bytes) would be generated randomly. The method is not limited to any particular size for the code/result produced by the biometric recognition, and the size/length of the code/result can vary depending on the biometric recognition that is used. For security purposes the public key of the encryption method is generally quite sizeable (like 1024, 2048 or 4096 bytes) whereas for biometric recognition matching purposes a result expressed in smaller size (in bytes) is easier for achieving a match. Accordingly, it is proposed to use the result (the code) of the biometric recognition to create a portion of, but not the whole, public key. Thus, the code could be half the length/size of the public key, or less than half, less than 30% or less than 15% of the length/size of the public key. This relation depends on the biometric recognition method used and on the key length being used.

Figure 2:
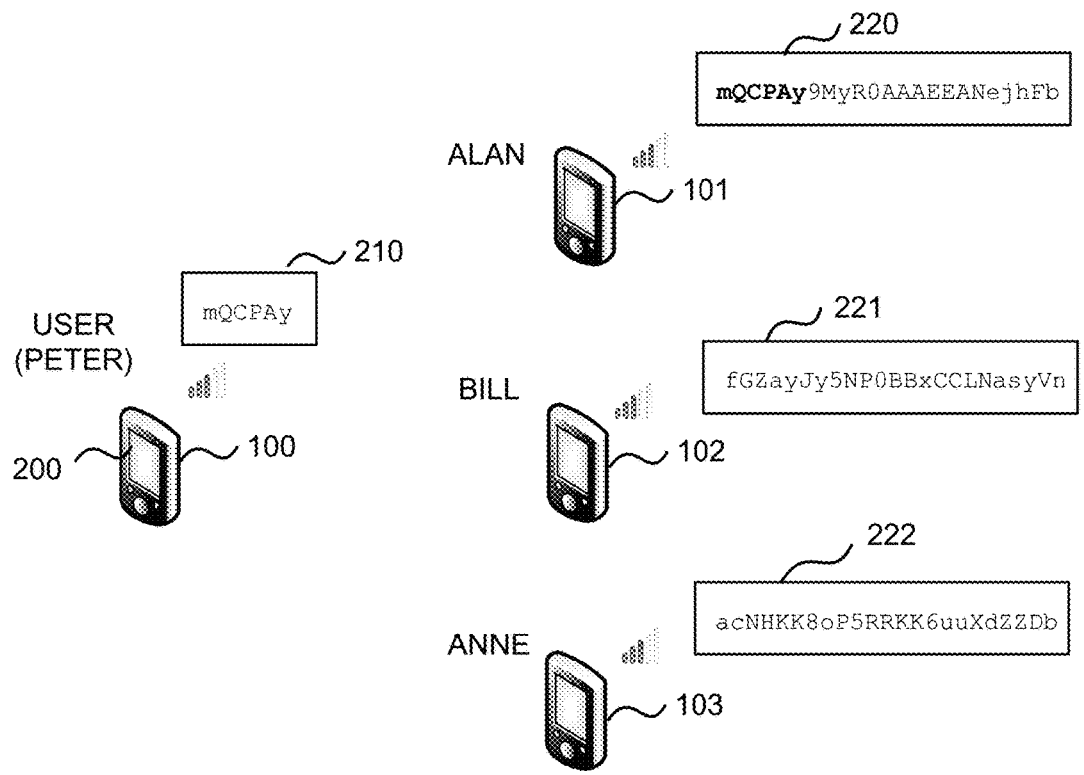
FIG. 2 illustrates an example of finding a particular wireless device.

Referring to FIG. 2 and FIG. 3b, an embodiment in explained. The description above in relation to FIGS. 1a and 1b is applicable to FIG. 2 as well, as the situation is similar, but for simplicity the description is not repeated here. For example, the user of device 100 wants to send some information to Alan, and wants to ensure the information is sent to the correct device 101 out of the devices 101-103 that the user's device 100 can see or detect in the same room or range. The user can take a picture of Alan, e.g., of his face (step 302), using a camera on his/her device 100. The face recognition calculates a result and thus produces a code (step 303), which in this example is "mQCPAy". Here, the code 210 produced by the face recognition when each user has trained their device is used to form the beginning of the public key 220-222 of each device 100-103. Accordingly, when the user has taken a picture of Alan using device 100 and device 100 has produced the code "mQCPAy", the device 100 then sends out a message (at step 305) to all or some of the devices 101-103 that device 100 can see/detect (as shown in FIG. 1b) by first scanning other devices within its range (step 304) and then asking (step 305) some or all "visible" devices 101-103 which device has the code "mQCPAy" in its public key. The scanning step 304 can take place any time before step 305, i.e. the scanning step can as well take place before step 302 or before step 303, or it can take place all the time (at certain intervals). Scanning frequently allows the list of available devices to be updated (as shown in FIG. 1b) when devices leave the room (go outside the range) and when new devices enter the room (enter the range).

The devices 101-103 receiving the request and the code check if they have the matching code "mQCPAy" that matches within a certain accepted tolerance. It is up to a designer of a biometric recognition method to decide what level of matching accuracy is accepted to produce a matching result. For some biometric recognition methods the matching accuracy may be between 80% to 90% and in other methods above 90%. Also, the matching of a code in relation to the matching of other codes is considered in selecting the device with the matching code. For example, if one device returns a 91% match and the other one 99% match, then the 99% match is the correct device. However, assuming there is only one device within the range, and that device returns a 91% match, then that device is the correct one. In a third example, if there is only one device within the range, and that device returns a 15% match, then there is clearly something wrong as that is too low of a percentage to be a match. The allowable matching levels (indicated as percentage or a decimal number in comparing the matching of two codes) can be decided by a designer designing a device and the recognition method.

In the embodiment presented herein, Alan's device 101 has the matching code, and in response sends (step 306) its public key 220 to the user's device 100. Now the user's device 100 knows that device 101 is the device of Alan and thus the correct device. Now the information that the user wants to send to Alan can be sent encrypted (step 307), with the correct public key 220 of Alan's device, to Alan's device. Alan's device 101 can then decrypt the information using the private key of Alan's device 101. As explained earlier, the information that is sent encrypted from the user's device 100 to Alan's device 101 could be a "friend request", or a request to exchange business cards or other contact information. Typically, in public key-private key encryption methods, such as PGP, when the user's device 100 sends the data encrypted with Alan's public key 220 to Alan's device 101, it will in the same transmission also send its own public key (i.e. the public key of user's device 100) to Alan's device 101. The first time the user's device 100 is interacting with Alan's device 101 it needs to receive (and thus needs to request) the public key 220 of Alan's device. After the user's device 100 has once received the public key 220 of Alan's device, it can store it in memory (such as 404 in FIG. 4) and can for future encrypt transmissions to Alan's device use the public key 220 from the memory of the user's device 100.

Each device typically has a MAC address or MAC id (identification) that is included in transmissions/transmitted messages. By also storing the MAC id of other devices (here of Alan's device and linking the public key 220 of Alan's device with the MAC id of Alan's device), the user's device can in future transmissions identify Alan's device based on the MAC id in transmissions from Alan's device. Likewise, the first time Alan's device 101 is receiving a transmission (e.g. encrypted data together with the public key of the user's device), Alan's device 101 can store in its memory the public key of the user's device 100 and the MAC id of the user's address and link the two. Thus, in further sending encrypted data from the user's device 100 to Alan's device, the user's device no longer needs to include the public key of the user's device in such transmissions as Alan's device already has it. Accordingly, in peer-to-peer communication the transmitted messages typically include the MAC address based on which device that transmits the message can be identified by the receiving device. Also some other identifier can be used instead of or in addition to the MAC address for identifying a device.

In the exemplary embodiment illustrated in FIG. 2 and described above the code "mQCPAy" is six characters long, and the public keys 220-222 "mQCPAy9MyR0AAAEEANejhFb", "fGZayJy5NP0BBxCCLNasyVn", "acNHKK8oP5RRKK6uuXdZZDb" are 23 characters long. However, both the code and the public keys could have another length. In the PGP encryption method the public key can have a length of e.g. 1024, 2048 or 4096 bytes, i.e. 1024, 2048 or 4096 characters. And as described earlier, the code 210 could have a length of e.g. 128 or 256 bytes, or even 750 bytes. However, to more easily achieve a matching result using face recognition, or other biometric recognition, the code 210 is shorter than the public key 220-222. For security purposes the public key is rather longer than shorter, e.g. 1024 bytes. The code 210 can be placed in the beginning of the public key 220-222 as shown in FIG. 2 (wherein the biometric recognition code of device 102 is "fGZayJ" and wherein the biometric recognition code of device 103 is "acNHKK") but the code 210 could as well be placed somewhere in the middle of or at the end of the public key 220-222. The rest of the public key can be generated randomly, e.g. using a random hash function.

Figure 3C:
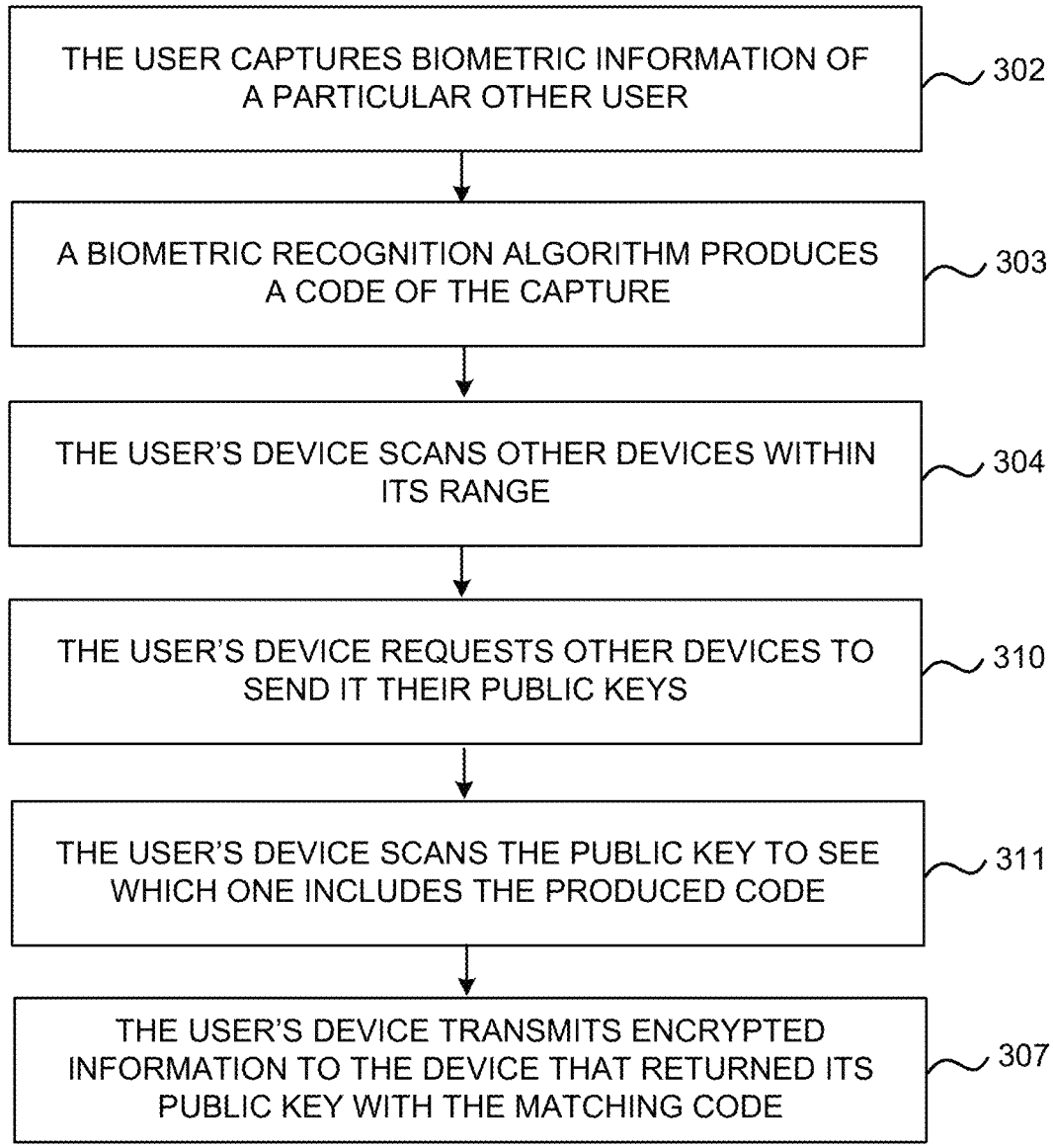
FIG. 3c is an example flow diagram of another method for transmitting data to the correct wireless device.

Another embodiment that can be used in the situation illustrated in FIG. 2 is shown in FIG. 3c as a flow diagram. The beginning of the method is the same as that described in relation to FIG. 3b, illustrated by steps 302-304. However, instead of the user's device 100 sending out the code 210 (at step 305) produced by biometric recognition (based on the picture taken of Alan), the user's device 100 requests the other (or some) visible devices 101-103 to transmit their public keys 220-222 at step 310. The user's device 100 then proceeds to check (at step 311) which of the public keys 220-222 it received includes the matching code (matching within a predetermined tolerance). The user's device 100 finds out that the public key 220 of Alan's device 101 includes the matching code, and thereafter proceeds to send the information (that it intends to send) at step 307 to Alan's device 101 encrypted, with the public key 220 of Alan's device, similarly as in the embodiment shown in FIG. 3b.

In another embodiment iris recognition is used for the biometric recognition. Also with this biometric recognition users would first train their devices 100-103 by taking a picture of either their left or right eye or of both eyes and the device would process that picture or those pictures using iris recognition to produce a code, and further to produce a public key of an encryption method, which public key includes the code. Thereafter when the user (Peter) wants to ensure that he is sending data to the correct device, to Alan's device 101, he takes a picture of at least one of Alan's eyes (or at least of the iris of one or both of Alan's eyes). After this the method proceeds as was described above, i.e. by using iris recognition on the taken picture to produce a code and checking which of the devices 101-103 has a public key of an encryption method, where the public key includes the same code as produced by iris recognition of the user's device within a certain matching tolerance similarly as was described herein above).

In yet another embodiment voice recognition is used for the biometric recognition. Also with this biometric recognition users would first train their devices 100-103 by taking a voice sample, e.g. by pronouncing certain words as instructed by their device so a microphone of the user's device can pick up the words and process them using voice recognition, and further to produce a public key of an encryption method, which public key includes the code. Thereafter when the user (Peter) wants to ensure that he is sending data to the correct device, to Alan's device 101, he/she captures a sample of Alan talking (one or more words) using e.g. a microphone on the user's device 100. After this the method proceeds as was described above, i.e. by using voice recognition on the taken voice sample to produce a code and checking which of the devices 101-103 has a public key of an encryption method, where the public key includes the same code as produced by voice recognition of the user's device within a certain matching tolerance similarly as was described herein above). Voice recognition can be used to identify the correct device of the person (here Alan) based on biometric data to whom the user wants to send date when the person (here Alan) is talking. Similarly, fingerprinting, palm printing, DNA sampling, or other types of recognition can also be used by capturing the appropriate biometric information. Further, any of these biometric recognition options may be combined to produce the code and public key and verify identify.

Figure 4:
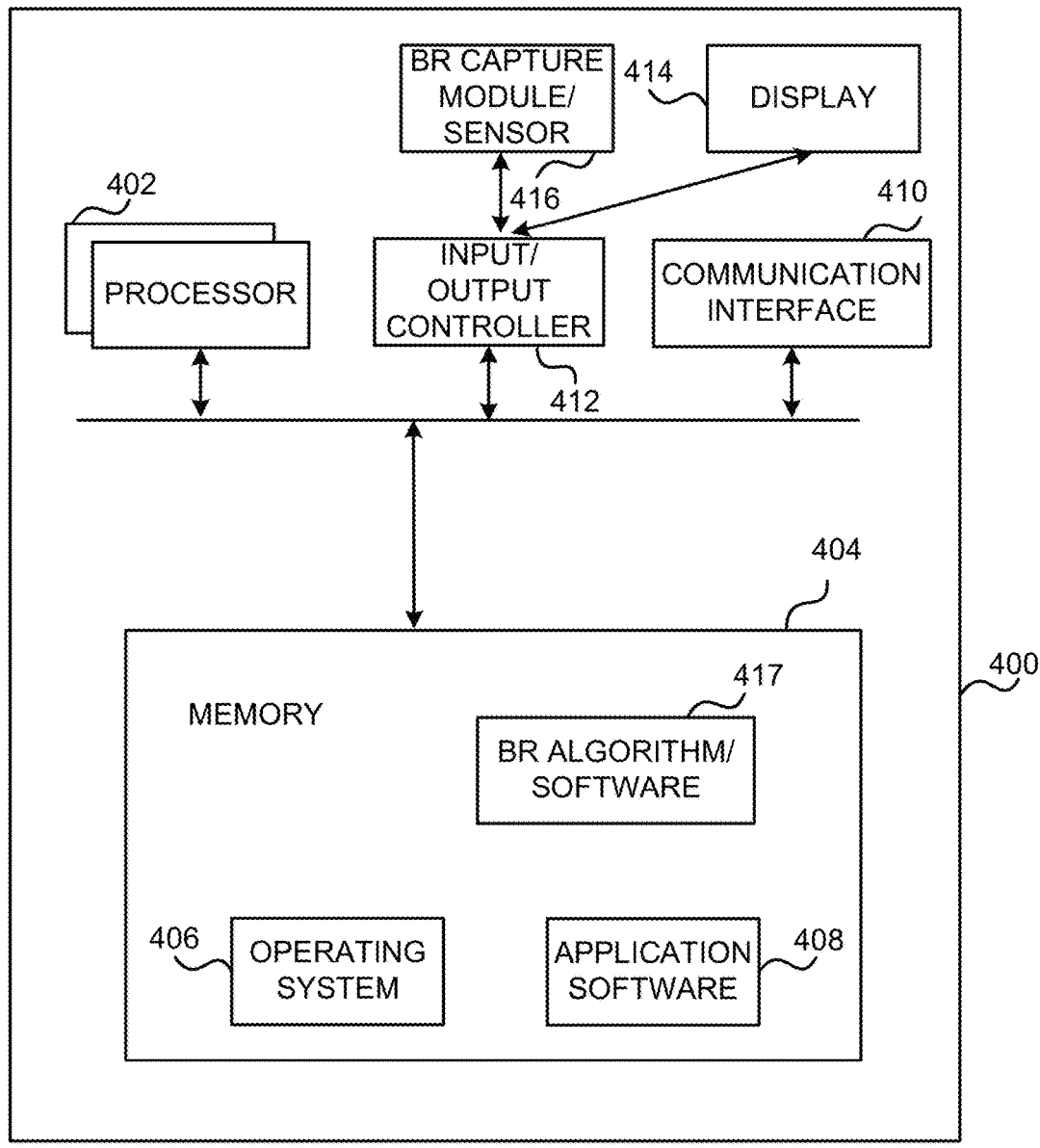
FIG. 4 is a block diagram of an example wireless device. Like reference numerals are used to designate like parts in the accompanying drawings.

FIG. 4 illustrates various components of an example wireless device 400 which may be implemented as any form of a computing and/or electronic device. The wireless device 400 may be used to implement the methods disclosed in any of FIGS. 2, 3a 3b and 3c. The wireless device 400 is, for example, a smart phone, a mobile phone, a tablet computer etc.

The wireless device 400 comprises one or more processors 402 which may be microprocessors, controllers or any other suitable type of processors for processing computer executable instructions to control the operation of the wireless device 400. Platform software comprising an operating system 406 or any other suitable platform software may be provided at the wireless device to enable application software 408 to be executed on the device. The wireless device 400 comprises a communication interface 410 for communicating with other devices. The communication interface 410 may comprise a receiver and a transmitter for both wireless reception and wireless transmission of data. The communication interface 410 may comprise more than one communication technology, of which at least one is a peer-to-peer wireless communication technology. Examples of suitable peer-to-peer wireless communication technologies are Wi-Fi Direct, Bluetooth, Wi-Fi Aware, Awarenet, near-me area network (NAN). The communication interface 410 may comprise, in addition to a transmitter and receiver, other necessary components for wireless transmission and reception, such as an antenna. The communication technology used in the communication interface 410 can be radio communication (rf, radio frequency), optical communication, sonic (e.g. ultrasonic) communication and electromagnetic induction.

Computer executable instructions may be provided using any computer-readable media that is accessible by the wireless device 400. Computer-readable media may include, for example, computer storage media such as memory 404 and communications media. Computer storage media, such as memory 404, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 404) is shown within the wireless device 400 it will be appreciated that the storage may be distributed or located remotely and accessed via a network or other communication link (e.g. using communication interface 410).

The wireless device 400 may comprise an input/output controller 412 arranged to output display information to a display device 414 which may be separate from or integral to the wireless device 400. The input/output controller 412 may also be arranged to receive and process input from one or more devices, such as a user input device (e.g. a keyboard, camera, microphone or other sensor). In one example, the display device 414 may also act as the user input device if it is a touch sensitive display device. The input/output controller 412 may also output data to devices other than the display device, e.g. a locally connected printing device.

The input/output controller 412 may be in communication with at least one biometric sensor or biometric data capture module 416 (shown in FIG. 4) such as one or more cameras, a microphone, an ultrasonic sensor and/or other sensors. This enables the wireless device 400 to receive data observed by the sensors 416 and to control the sensors 416.

The input/output controller 412, display device 414 and optionally user input device may comprise natural user interaction (NUI) technology which enables a user to interact with the wireless device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence.

The processor 402 or one of the processors 402 may be configured to obtain information representing biometric data of a user using the biometric data capture module 416, process the information e.g. with a biometric recognition algorithm or software 417 with the one or more processors 402 to produce a code, to send the code over a wireless technology using communication interface 410 (a wireless transmitter) requesting response of a device having a matching code, the matching being within a predetermined tolerance, to receive at communication interface 410 (a wireless receiver) as a response at least one of a public key and the identity of the device having the matching code, wherein the public key relates to an encryption method, and includes the code as a part of the key, to encrypt data to be transmitted with the public key, and to send using the communication interface 410 the encrypted data to the device with the matching code.

There may be a dedicated processor 402 for performing the encryption method, and such processor may be called a cryptoprocessor.

An example of a method comprises obtaining information representing biometric data of a user, processing the information to produce a code, sending the code over a wireless technology, requesting a response of a device having a matching code, the matching being within a predetermined tolerance, receiving as a response at least one of a public key and the identity of the device having the matching code, wherein the public key relates to an encryption method and includes the code as a part of the key, encrypting data to be transmitted with the public key, and sending the encrypted data to the device with the matching code.

In one example the method comprises processing the information using biometric recognition to produce the code.

In one example, alternatively or in addition, the method comprises obtaining at least one image representing the face of a user, and processing the information using face recognition to produce the code.

In one example, alternatively or in addition, the method comprises obtaining at least one image representing at least one iris of a user, and processing the information using iris recognition to produce the code.

In one example, alternatively or in addition, the method comprises obtaining at least one speech sample representing the voice of a user, and processing the sample using voice recognition to produce the code.

In one example, alternatively or in addition, the code has a length of half or less of the length of the public key.

In one example, alternatively or in addition, the encryption method is pretty good privacy (PGP) and the public key is the public key of the PGP encryption method.

In one example, alternatively or in addition, the wireless technology is a peer-to-peer wireless technology.

In one example, alternatively or in addition, the image is obtained using a digital camera.

In one example, alternatively or in addition, wherein sending the encrypted data comprises sending the following to the device with the matching code: the encrypted data, the public key of a sending device, and the public key of the device with the matching code.

An example of a wireless device comprises a biometric data capture module for obtaining information representing biometric data of a user, a processor for processing the information to produce a code, a wireless transmitter for sending the code over a wireless technology requesting response of a device having a matching code, the matching being within a predetermined tolerance, a wireless receiver for receiving as a response at least one of a public key and the identity of the device having the matching code, wherein the public key relates to an encryption method and includes the code as a part of the key, a cryptoprocessor for encrypting data to be transmitted with the public key, the wireless transmitter being configured to send the encrypted data to the device with the matching code.

In one example the processor is configured to process the information using biometric recognition to produce the code.

In one example, alternatively or in addition, the wireless device comprises a camera for obtaining at least one image representing the face of a user, and the processor being configured to process the information using face recognition to produce the code.

In one example, alternatively or in addition, the wireless device comprises a camera for obtaining at least one image representing at least one iris of a user, and the processor being configured to process the information using iris recognition to produce the code.

In one example, alternatively or in addition, the wireless device comprises a microphone for obtaining at least one speech sample representing the voice of a user, and the processor being configured to process the sample using voice recognition to produce the code.

In one example, alternatively or in addition, the code has a length of half or less of the length of the public key.

In one example, alternatively or in addition, the encryption method is pretty good privacy (PGP) and the public key is the public key of the PGP encryption method.

In one example, alternatively or in addition, the wireless technology is a peer-to-peer wireless technology.

In one example, alternatively or in addition, the wireless transmitter is configured to send the following to the device with the matching code: the encrypted data, the public key of a sending device, and the public key of the device with the matching code.

Another example of a method comprises obtaining information representing biometric data of a user, processing the information to produce a code, receiving at least one public key that relates to an encryption method over a wireless technology from at least one device, checking if any of the received at least one public key includes a code matching the produced code, the matching being within a predetermined tolerance, encrypting data to be transmitted with the public key having the matching code, sending the encrypted data to the device from which the public key including the matching code was received.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Alternatively, or in addition, the functionality described herein (such as the encryption and biometric recognition) can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the device functionality or method sequences may be performed by one or more hardware logic components.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method comprising:
   identifying a user to send communications to from a first device;
   obtaining, by the first device, information representing data of the user;
   processing, by the first device, the information to produce a first code;
   identifying a second device for the user in which to send the communications to from the first device;
   sending, from the first device, the first code over a wireless technology, requesting a response of the second device having a second code that matches the first code within a predetermined tolerance;
   receiving, as a response, a public key and an identity of the second device having the matching second code, wherein the public key relates to an encryption method and includes the matching second code as a first portion of the public key, a second portion of the public key being randomly generated;
   encrypting data to be transmitted with the public key; and
   sending, from the first device, the communications to the second device, the communications comprising the encrypted data, a public key of the first device, and the public key of the second device with the matching second code.

2. A method as claimed in claim 1, further comprising processing the information using biometric recognition to produce the first code.

3. A method as claimed in claim 1, wherein the method further comprises:
   obtaining at least one image representing the face of the user; and
   processing the information using face recognition to produce the first code.

4. A method as claimed in claim 3, wherein the at least one image is obtained using a digital camera.

5. A method as claimed in claim 1, wherein the method further comprises:
   obtaining at least one image representing at least one iris of the user; and
   processing the information using iris recognition to produce the first code.

6. A method as claimed in claim 5, wherein wherein the at least one image is obtained using a digital camera.

7. A method as claimed in claim 1, wherein the method further comprises:
   obtaining at least one speech sample representing the voice of the user; and
   processing the at least one speech sample using voice recognition to produce the first code.

8. A method as claimed in claim 1, wherein the matching second code in the first portion has a length of half or less of a length of the public key.

9. A method as claimed in claim 1, wherein the encryption method is pretty good privacy (PGP) and the public key is the public key of the PGP encryption method.

10. A method as claimed in claim 1, wherein the wireless technology is a peer-to-peer wireless technology.

11. A wireless device comprising:
   a data capture module for obtaining information representing data of a user to send communications to from the wireless device;
   a processor for;
      processing the information to produce a first code; and
      identifying a second device for the user in which to send the communications to from the wireless device;
   a wireless transmitter for sending the first code over a wireless technology requesting response from the second device having a second code the first code within a predetermined tolerance;
   a wireless receiver for receiving, as a response, a public key and an identity of the second device having the matching second code, wherein the public key relates to an encryption method and includes the matching second code in a first portion of the public key, a second portion of the public key being randomly generated;
   a cryptoprocessor for encrypting data to be transmitted with the public key; and
   the wireless transmitter being configured to send the communications to the second device, the communications comprising the encrypted data, a public key of the wireless device, and the public key of the second device with the matching second code.

12. A wireless device as claimed in claim 11, wherein the processor is further configured to process the information using biometric recognition to produce the first code.

13. A wireless device as claimed in claim 11, further comprising:
   a camera for obtaining at least one image representing a face of the user; and
   the processor being further configured to process the information using face recognition to produce the first code.

14. A wireless device as claimed in claim 11, further comprising:
   a camera for obtaining at least one image representing at least one iris of the user; and
   the processor being further configured to process the information using iris recognition to produce the first code.

15. A wireless device as claimed in claim 11, further comprising:
   a microphone for obtaining at least one speech sample representing a voice of the user; and
   the processor being configured to process the at least one speech sample using voice recognition to produce the first code.

16. A wireless device as claimed in claim 11, wherein the matching second code has a length of half or less of a length of the public key.

17. A wireless device as claimed in claim 11, wherein the encryption method is pretty good privacy (PGP) and the public key is the public key of the PGP encryption method.

18. A wireless device as claimed in claim 11, wherein the wireless technology is a peer-to-peer wireless technology.

19. A wireless device as claimed in claim 11, wherein the matching second code has a length that is less than 30% of a length of the public key.

20. One or more computer-readable storage devices comprising computer executable instructions that, when executed by one or more processors, cause the one or more processors to perform the following:
   identifying a user to send communications to from a first device;
   obtaining, by the first device, information representing data of the user;
   processing, by the first device, the information to produce a first code;
   identifying a second device for the user in which to send the communications to from the first device;
   sending, from the first device, the first code over a wireless technology, requesting a response of the second device having a second code that matches the first code within a predetermined tolerance;
   receiving, as a response, a public key and an identity of the second device having the matching second code, wherein the public key relates to an encryption method and includes the matching second code as a first portion of the public key, a second portion of the public key being randomly generated;
   encrypting data to be transmitted with the public key; and
   sending, from the first device, the communications to the second device, the communications comprising the encrypted data, a public key of the first device, and the public key of the second device with the matching second code.

* * * * *